June 9, 1953 — P. M. BOURDON — 2,641,498
WHEEL FOR RAIL VEHICLES
Filed April 9, 1946 — 2 Sheets-Sheet 1

INVENTOR
PIERRE M. BOURDON
BY Wilkinson & Mawhinney
ATTORNEYS

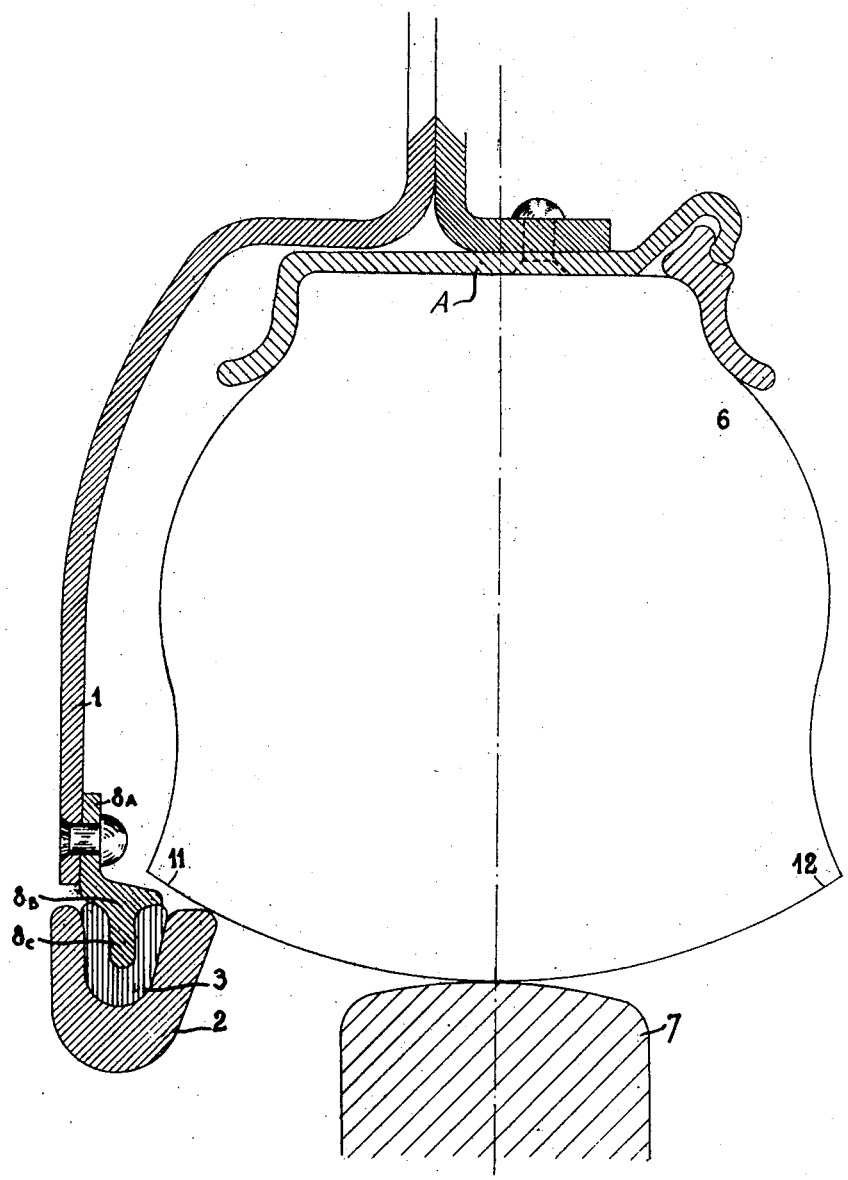

Patented June 9, 1953

2,641,498

UNITED STATES PATENT OFFICE 2,641,498

WHEEL FOR RAIL VEHICLES

Pierre M. Bourdon, Paris, France, assignor to Puiseux; Boulanger et Cie, trading under the name "Manufacture de c/c Michelin," Paris, France, a company of France Application April 9, 1946, Serial No. 660,793
In France June 28, 1945

2 Claims. (Cl. 295—31)

Wheels of rail vehicles fitted with pneumatic tires have on their inner face a flange or similar member termed the "protecting flange" carrying the guide flange. It has been found that there is a tendency for stones and other bodies thrown up from the track to penetrate the gap between this guide flange and the pneumatic tire where they remain wedged between the tire and the protecting flange to the detriment and deterioration of the tire.

According to this invention the protecting flange is located on the outside flank of the tire while the guide flange is offset towards the rail in relation to the protecting flange so that only a small distance separates it from the tread of the tire.

Preferably also the tire is so constructed that its transverse dimension carries it beyond the inner edge of the rim of the guide flange.

The invention comprises also an arrangement of a flange according to the preceding features comprising moreover a built up rib, which, besides being detachable, comprises an easily replaceable and light external ring.

The invention is diagrammatically illustrated in the accompanying drawings, in which:

Figure 3 is a section, showing a wheel rim and tire having a built up and detachable flange.

Figure 2:
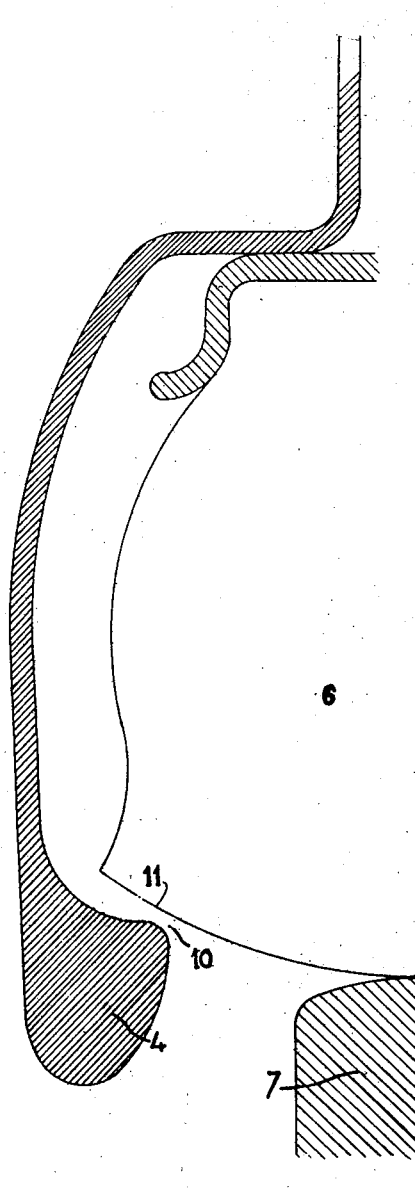
Fig. 2 is a half sectional view of a modification of the present invention, showing the application of the invention to a pneumatic tire of suitable section.

Referring to the drawings A indicates generally a wheel rim carrying a pneumatice tire 6 while 7 is the rail of the permanent way. Integral with or forming part of the wheel, a protecting flange 1, terminates in a rib 4 constituting the guide flange proper.

Figure 1:
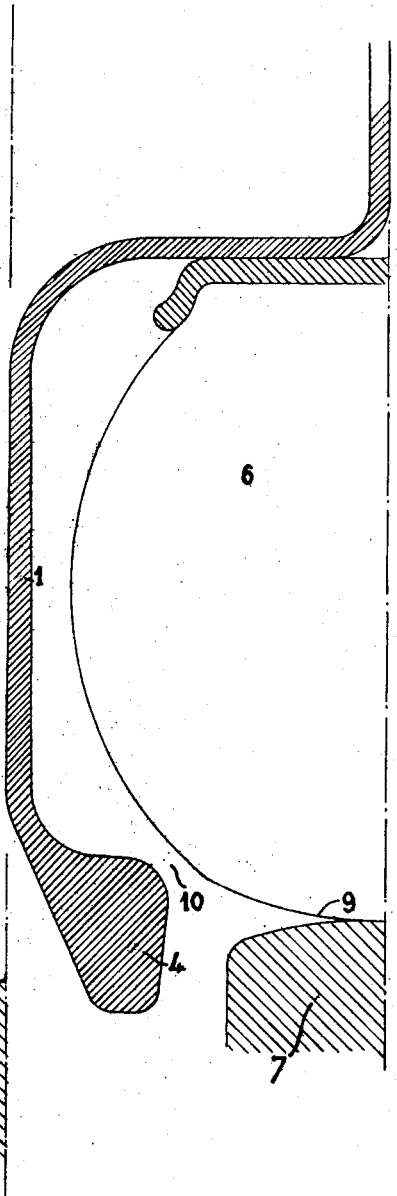
Fig. 1 is a half sectional view showing a wheel rim and tire and guide flange in accordance with the invention.

According to the invention, the protecting flange, with the rib 4 is so arranged that it is located externally of the thread surface 9 of the tire and at only a small distance therefrom so that the distance or gap 10 separating the rib 4 from the tread does not normally permit the ingress of stones or other objects picked up by the passage of the train, as best seen in Figures 1 to 3.

In the construction shown in Figure 2, the tire 6 is formed with a modified tread 11, which has a greater transverse dimension so that it projects beyond and is located behind the rib 4, thereby further reducing the risk of penetration between this flange and the tire as not only can the gap 10 be reduced but the passage of entry is in a substantially horizontal plane.

Obviously the tire can be symmetrical in section and with the type of section shown in Figure 3, it is possible (see Fig. 3) to increase the life of the tire when one side is worn, simply by reversing it on the wheel.

Figure 3 further illustrates a construction of wheel rim and flange, having a readily replaceable rib and which is light and reduces noise. This construction forms the subject matter of French Patent No. 700,703, dated August 18, 1930. It comprises a noise reducing and shock absorbing layer 3, placed between two metal elements 8 and 2. But in the construction of Figure 3 the replaceable rib comprises a cruciform sole piece 8a, fast with the flange 1 and providing a seating 8b having a vertical rib 8c, which is offset laterally (towards the rail) with respect to the part 8a. On the rib 8c is mounted a U-section guide flange 2. This arrangement permits a rapid replacement of flange 2 when worn and also reduces to a minimum the weight of the metal pieces constituting the flange. There results an economy of manufacture and a reduction of the inertia of the flange.

What is claimed is:

1. A wheel for railway vehicles comprising a pneumatic tire having flexible sidewalls and a tread for engagement with a rail, said tread having a transverse width at least equal to the distance between the outermost surfaces of said sidewalls, a rim for mounting said tire, an annular guide flange having its inner periphery detachably fixed to said rim and its outer periphery adjacent to one edge of said tread, and an annular bead on the outer periphery of said guide flange overlapping said tread in proximity thereto and defining with said tread a narrow annular gap substantially perpendicular to the median plane of said tire.

2. A wheel for rail vehicles, comprising a pneumatic tire having a running tread surface for engagement with a rail, said tread surface having lateral edges extending out at least even with the outermost surfaces of the sidewalls of said tire, a rim for mounting said tire, a guide flange fixed to said rim and extending outwardly therefrom beyond said tread at one side thereof, and an annular bead on the outer edge of said flange overlapping one of said lateral edges of said tread in proximity thereto to define a narrow annular gap between said bead and said tread substantially perpendicular to the median plane of said tire.

PIERRE MARCEL BOURDON.

References Cited in the file of this patent

UNITED STATES PATENTS

| Number | Name | Date |
|---|---|---|
| 1,782,285 | Bourdon | Nov. 18, 1930 |
| 2,039,726 | Ledwinka | May 5, 1936 |

FOREIGN PATENTS

| Number | Country | Date |
|---|---|---|
| 628,452 | Germany | Mar. 19, 1936 |
| 295,994 | Italy | May 6, 1932 |
| 160,325 | Switzerland | Feb. 28, 1933 |